(12) United States Patent
Kawada et al.

(10) Patent No.: US 12,350,685 B2
(45) Date of Patent: Jul. 8, 2025

(54) ELECTROSTATIC PRECIPITATOR AND ADDITIVE MANUFACTURING APPARATUS

(71) Applicant: Sodick Co., Ltd., Kanagawa (JP)

(72) Inventors: Shuichi Kawada, Kanagawa (JP); Hiroki Tatsuno, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 673 days.

(21) Appl. No.: 17/722,377

(22) Filed: Apr. 17, 2022

(65) Prior Publication Data

US 2022/0355311 A1 Nov. 10, 2022

(30) Foreign Application Priority Data

May 7, 2021 (JP) .................................. 2021-078893

(51) Int. Cl.
*B03C 3/017* (2006.01)
*B03C 3/08* (2006.01)
(Continued)

(52) U.S. Cl.
CPC ................ *B03C 3/017* (2013.01); *B03C 3/08* (2013.01); *B03C 3/47* (2013.01); *B22F 10/20* (2021.01); *B29C 64/371* (2017.08); *B33Y 30/00* (2014.12)

(58) Field of Classification Search
CPC ......... B03C 1/0332; B03C 1/035; B03C 1/30; B03C 3/017; B03C 3/019; B03C 3/08;
(Continued)

(56) References Cited

U.S. PATENT DOCUMENTS

| 2,542,054 A | * | 2/1951 | Penney | ..................... B03C 5/02 |
| | | | | 204/666 |
| 2,789,658 A | * | 4/1957 | Wintermute | ............ B03C 3/017 |
| | | | | 96/87 |

(Continued)

FOREIGN PATENT DOCUMENTS

| JP | S5437507 | 11/1979 |
| JP | H04242271 | 8/1992 |

(Continued)

OTHER PUBLICATIONS

Translation of KR102298965B1, accessed Mar. 3, 2025 (Year: 2021).*

*Primary Examiner* — Jennifer Dieterle
*Assistant Examiner* — Phillip Y Shao
(74) *Attorney, Agent, or Firm* — JCIPRNET

(57) ABSTRACT

The invention provides an electrostatic precipitator, including: a gas inlet, supplied with gas containing dust that is a magnetic substance; a charging part, charging the dust; a collecting part, capturing the charged dust; a cleaning device, including at least one of a charging part cleaning device and a collecting part cleaning device; a magnet filter, provided downstream of the collecting part; an ozone removing filter, provided downstream of the magnet filter and removing ozone from the gas; and a gas outlet, discharging the gas in which the dust and the ozone are removed. In the magnet filter, multiple magnet plates are arranged at a predetermined interval. A downstream side of each magnet plate provided on an upper side with respect to (Continued)

a center is inclined downward. A downstream side of each magnet plate provided on a lower side with respect to the center is inclined upward.

12 Claims, 11 Drawing Sheets

(51) Int. Cl.
*B03C 3/47* (2006.01)
*B22F 10/20* (2021.01)
*B29C 64/371* (2017.01)
*B33Y 30/00* (2015.01)

(58) Field of Classification Search
CPC .. B03C 3/12; B03C 3/368; B03C 3/41; B03C 3/47; B03C 3/743; B03C 3/76; B03C 3/80; B03C 3/88; B03C 2201/06; B03C 2201/10; B03C 2201/20; B22F 2201/20; B22F 10/20; B22F 10/28; B22F 10/77; B22F 12/70; B22F 12/82; B29C 64/371; B33Y 30/00; B33Y 40/00; Y02P 10/25
See application file for complete search history.

(56) References Cited

U.S. PATENT DOCUMENTS

| | | | | |
|---|---|---|---|---|
| 3,250,060 | A * | 5/1966 | Van Luik, Jr. et al. | B03C 3/04 55/296 |
| 3,844,741 | A * | 10/1974 | Dimitrik | B03C 3/017 250/431 |
| 3,874,858 | A * | 4/1975 | Klugman | B03C 3/16 96/290 |
| 6,235,090 | B1 * | 5/2001 | Bernstein | B03C 3/47 96/57 |
| 6,302,945 | B1 * | 10/2001 | Altman | B03C 3/025 96/50 |
| 10,471,509 | B2 | 11/2019 | Muranaka | |
| 2012/0207647 | A1 * | 8/2012 | Kim | A61L 9/22 422/107 |
| 2014/0348711 | A1 * | 11/2014 | Ajemian | B01D 50/10 422/123 |
| 2018/0015542 | A1 | 1/2018 | Muranaka | |

FOREIGN PATENT DOCUMENTS

| | | |
|---|---|---|
| JP | 6095147 | 3/2017 |
| JP | 6600211 | 10/2019 |
| KR | 102298965 B1 * | 9/2021 |

* cited by examiner

ELECTROSTATIC PRECIPITATOR AND ADDITIVE MANUFACTURING APPARATUS

CROSS-REFERENCE TO RELATED APPLICATION

This application claims the priority benefit of Japan application serial no. 2021-078893, filed on May 7, 2021. The entirety of the above-mentioned patent application is hereby incorporated by reference herein and made a part of this specification.

BACKGROUND

Technical Field

The invention relates to an electrostatic precipitator and an additive manufacturing apparatus including the electrostatic precipitator.

Description of Related Art

An electrostatic precipitator is known as an apparatus for removing dust from gas. The electrostatic precipitator includes: a charging part positively or negatively charging, through corona discharge, dust included in the gas; and a dust collecting part, capturing the charged dust by using a Coulomb force.

Such electrostatic precipitator is utilized in, for example, additive manufacturing. In an additive manufacturing apparatus, in order to prevent a material layer and a solidified layer from changing in quality, a solidified layer is formed in a chamber filled with inert gas. In the additive manufacturing apparatus, at the time of melting or sintering the material layer by irradiating the material layer with a laser beam or an electronic beam to form a solidified layer, smoke, which is referred to as fume, as a kind of dust, is generated. Since such fume shields the laser beam or the electronic beam and contaminates an optical component, such fume may affect the manufacturing quality. Therefore, the additive manufacturing apparatus is configured to supply inert gas at a predetermined concentration into the chamber and discharge the inert gas including fume in the chamber. The inert gas discharged from the chamber is transmitted to the electrostatic precipitator, and is returned to the chamber after the fume is removed from the inert gas. By doing so, the inside of the chamber is kept in a clean inert gas atmosphere, and the inert gas can be reused.

After the electrostatic precipitator is used for a long time, dust accumulates in the charging part or the dust collecting part, and the dust capturing ability of the electrostatic precipitator is reduced. Therefore, it is conventional for an electrostatic precipitator to clean the charging part or the dust collecting part during use to extend the continuous usable time. For example, Patent Document 1 discloses an electrostatic precipitator which performs cleaning with respect to the charging part by discharging inert gas, and performs cleaning with respect to the dust collecting part by using a scraper, etc.

In the electrostatic precipitator, ozone may be generated during corona discharge. Ozone has a particular odor, and it is not favorable to discharge ozone to the outside as it is from the perspective of occupational health. In addition, ozone may deteriorate parts formed by resin, rubber, etc. Therefore, it is favorable to remove the ozone generated through corona discharge from the gas. Patent Document 2 discloses an electrostatic precipitator including an ozone removing device which removes the ozone generated through corona discharge.

A member able to collect dust may also be provided in addition to the dust collecting part. For example, Patent Document 3 discloses an electrostatic precipitator including a magnetic dust collecting plate formed by an electromagnet in the vicinity of a gas inlet and a gas outlet. If dust is magnetic, it is possible to capture the dust by using such magnetic dust collecting plate.

PRIOR ART DOCUMENTS

Patent Documents

Patent Document 1: Japanese Patent No. 6095147
Patent Document 2: Japanese Patent No. 6600211
Patent Document 3: Japan Utility Model Publication No. S54-037507.

In an electrostatic precipitator including a cleaning device that cleans the charging part or the dust collecting part, during cleaning, the dust may be scattered for another time. Specifically, the dust attached to the charging part or the dust collecting part may be stirred up and scattered in the gas again. Specifically, compared with a wet-type electrostatic precipitator in which a cleaning liquid is sprayed to the dust collecting part to wash away the dust, the amount of the dust scattered for another time is more than the amount in a dry-type electrostatic precipitator in which the dust is captured in a dry state without using a cleaning liquid during cleaning.

In addition, in the electrostatic precipitator including an ozone removing filter for removing ozone from the gas, it is possible that the dust scattered for another time is attached to the ozone removing filter and clogs the ozone removing filter.

In addition, in order to increase the service time of the ozone filter, it is favorable that the gas be distributed substantially uniformly over a wider area of the ozone removing filter.

SUMMARY

An aspect of the invention provides an electrostatic precipitator. The electrostatic precipitator includes: a charging part, provided inside the housing and positively or negatively charging the dust; a collecting part, provided inside the housing and capturing the charged dust; a cleaning device, provided in the housing, and comprising at least one of a charging part cleaning device that removes the dust attached to the charging part and a collecting part cleaning device that removes the dust attached to the collecting part; a magnet filter, provided downstream of the collecting part and inside the housing; an ozone removing filter, provided downstream of the magnet filter and insides the housing and removing ozone from the gas; and a gas outlet, provided on the housing and discharging the gas in which the dust and the ozone are removed. In the magnet filter, multiple magnet plates are arranged at a predetermined interval. A downstream side of each magnet plate provided on an upper side with respect to a center is inclined downward. A downstream side of each magnet plate provided on a lower side with respect to the center is inclined upward.

DESCRIPTION OF THE EMBODIMENTS

The invention provides an electrostatic precipitator and an additive manufacturing apparatus which prevent the dust scattered for another time from being attached to and clogging the ozone removing filter and increases the service time of the ozone removing filter so that the gas is distributed substantially uniformly over a wider area of the ozone removing filter.

In the electrostatic precipitator of the invention, the magnet filter is arranged downstream of the collector, and the ozone removing filter is arranged downstream of the magnet filter. Moreover, in the magnet filter, multiple magnet plates are arranged at a predetermined interval, a downstream side of each magnet plate provided on an upper side with respect to a center is inclined downward, and a downstream side of each magnet plate provided on a lower side with respect to the center is inclined upward. When the dust is a magnetic substance, since the dust scattered for another time can be attracted and removed with such magnet filter, the ozone removing filter is prevented from clogging. In addition, the magnetic plates as arranged above serve as straightening vanes. Therefore, the gas can substantially uniformly flow in a wider area in the filtering region of the ozone removing filter, and the service time of the ozone removing filter is increased.

In the following, the embodiment of the invention will be described with reference to the drawings. Specifically, the embodiment of the invention is described as an additive manufacturing apparatus including an electrostatic precipitator. In the embodiment, the gas transmitted to the electrostatic precipitator is inert gas, and the dust as the capturing target is fume which is a magnetic substance generated when a solidified layer is formed. Various modified examples described in the following can be respectively and arbitrarily combined and put into practice.

Figure 1:
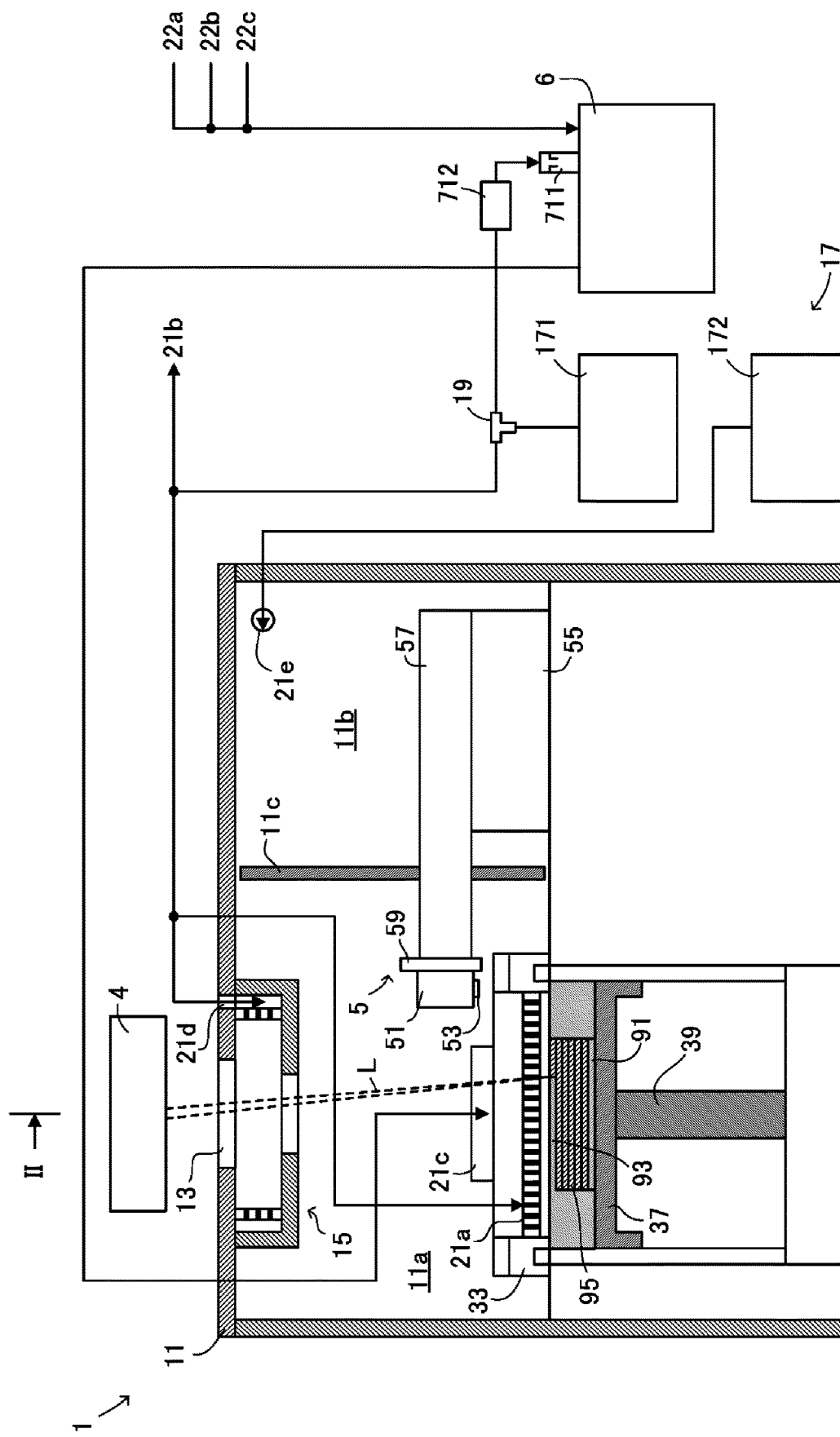
FIG. 1 is a side view illustrating an additive manufacturing apparatus according to the embodiment.
Figure 2:
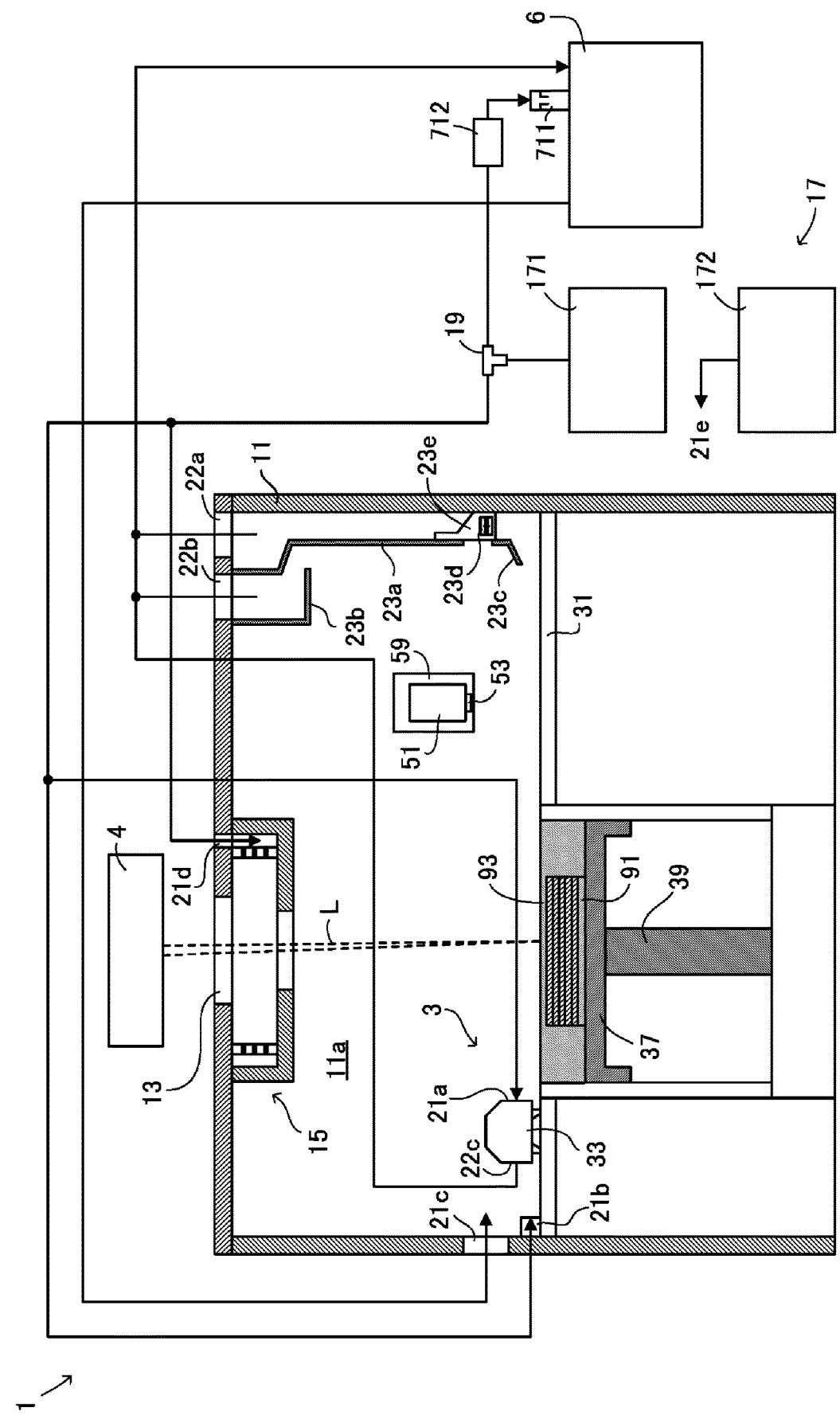
FIG. 2 is a view taken along an arrow II-II of FIG. 1.

FIGS. 1 and 2 are views illustrating the schematic configuration of an additive manufacturing apparatus 1 according to the embodiment. The additive manufacturing apparatus 1 is an apparatus manufacturing a desired three-dimensional object by repetitively and alternately forming a material layer 93 and forming a solidified layer 95 and laminating multiple solidified layers 95. The additive manufacturing apparatus 1 includes a chamber 11, a material layer forming device 3, an irradiation device 4, a cutting device 5, and an inert gas supply/discharge mechanism.

The chamber 11 is configured to be substantially enclosed, and covers a build region, which a region where the desired three-dimensional object can be built. At the time of building, the chamber 11 is filled with inert gas at a predetermined concentration. The chamber 11 is partitioned by a bellows 11c into a build chamber 11a having the build region and forming the three-dimensional object and a driving chamber 11b accommodating a major portion of a driving device of the cutting device 5. A communication part, which is a fine gap through which only the inert gas can pass, is present between the build chamber 11a and the driving chamber 11b.

The material layer forming device 3 is provided inside the build chamber 11a of the chamber 11, and forms the material layer 93 in a predetermined thickness. The material layer forming device 3 includes a base stage 31 having the build region and a recoater head 33 arranged on the base stage 31. The recoater head 33 is configured to be movable in the horizontal direction by a recoater head driving device having any actuator and not shown herein. A build table 37 is arranged in the build region. The build table 37 is configured to be movable in the vertical direction by a build table driving device 39 having any actuator. At the time of building, a base plate 91 may also be arranged on the build table 37, and the first material layer 93 may be formed on the base plate 91.

Figure 3:
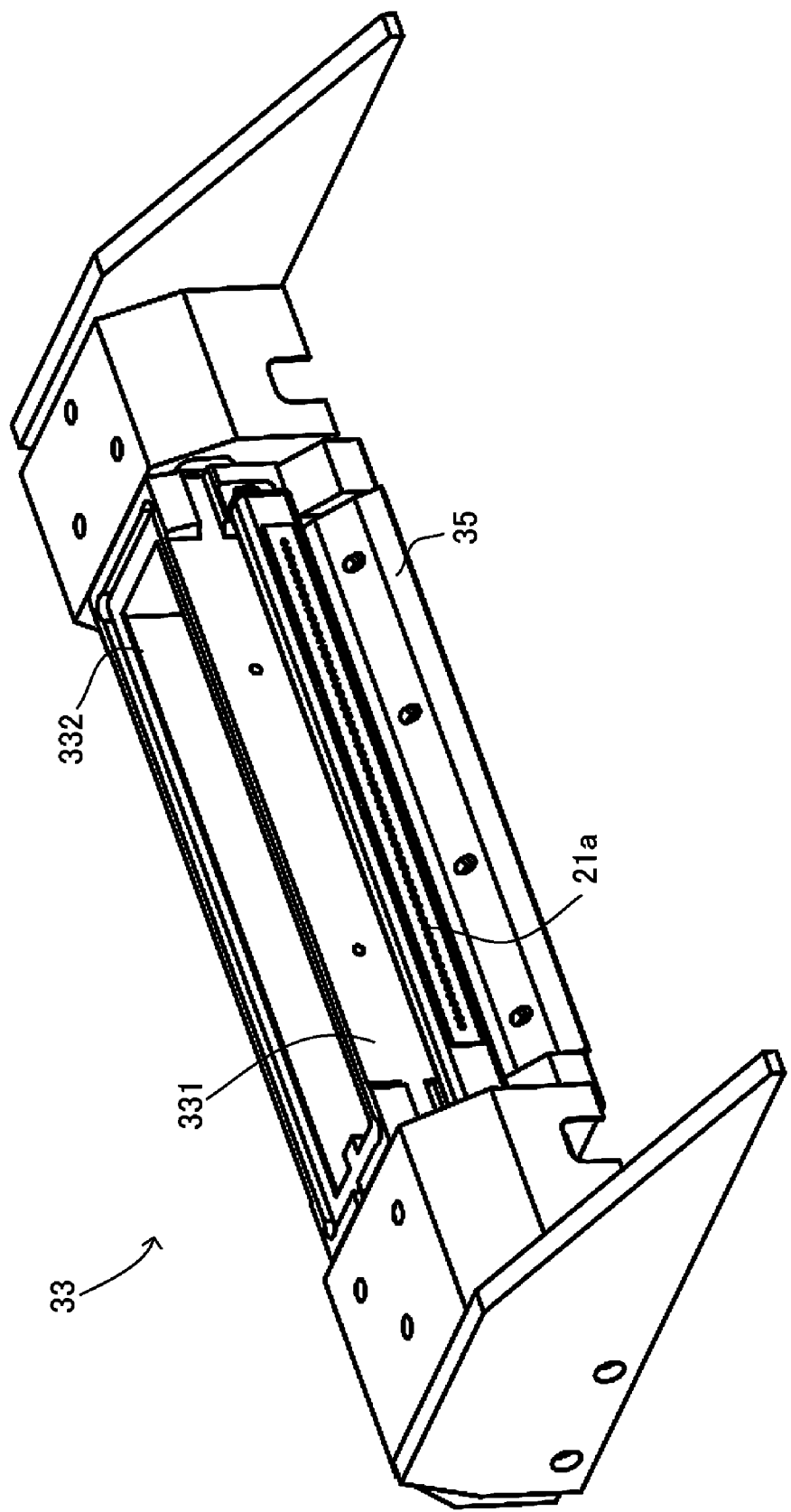
FIG. 3 is a perspective view illustrating a recoater head when viewed from the top.
Figure 4:
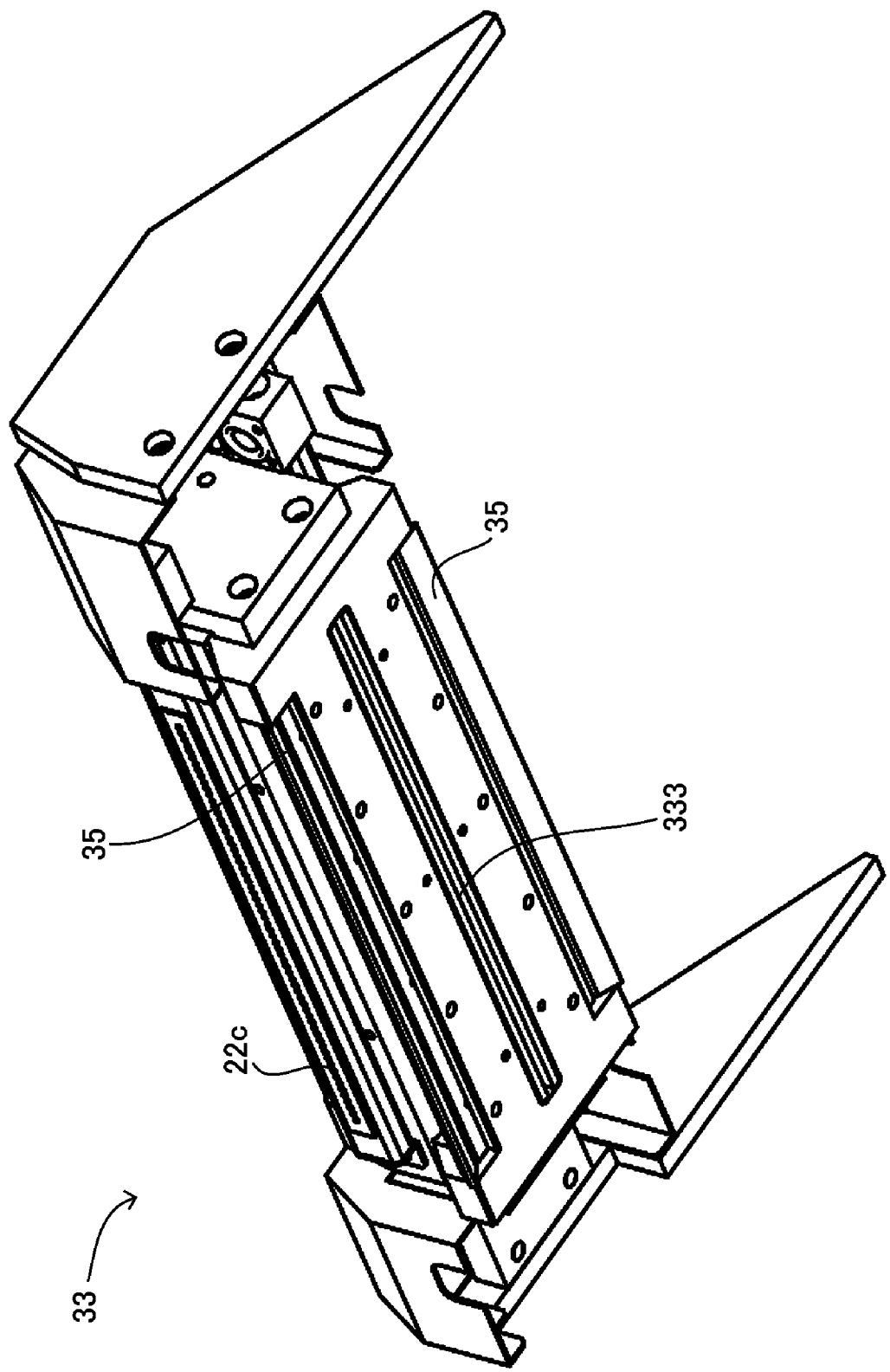
FIG. 4 is a perspective view illustrating the recoater head when viewed from the bottom.

As shown in FIGS. 3 and 4, the recoater head 33 includes a material accommodating part 331, a material supply port 332, and a material discharge port 333. The material accommodating part 331 stores material powder. The material supply port 332 is provided on the upper surface of the material accommodating part 331, and is a port receiving the material powder supplied from a material supplier not shown herein to the material accommodating part 331. The material discharge port 333 is provided on the bottom surface of the material accommodating part 331, and discharges the material powder inside the material accommodating part 331. The material discharge port 333 has a slit shape extending in the horizontal direction orthogonal to the moving direction of the recoater head 33. A blade 35 that smooths the material powder to form the material layer 93 is provided on the side surface of the recoater head 33. The recoater head 33 reciprocally moves in the horizontal direction on the build region while discharging the material powder accommodated inside the material accommodating part 331 from the material discharge port 333. At this time, the blade 35 flattens the discharged material powder to form the material layer 93. In the embodiment, the material powder may be any magnetic substance and is typically the powder of ferromagnetic metal.

Figure 5:
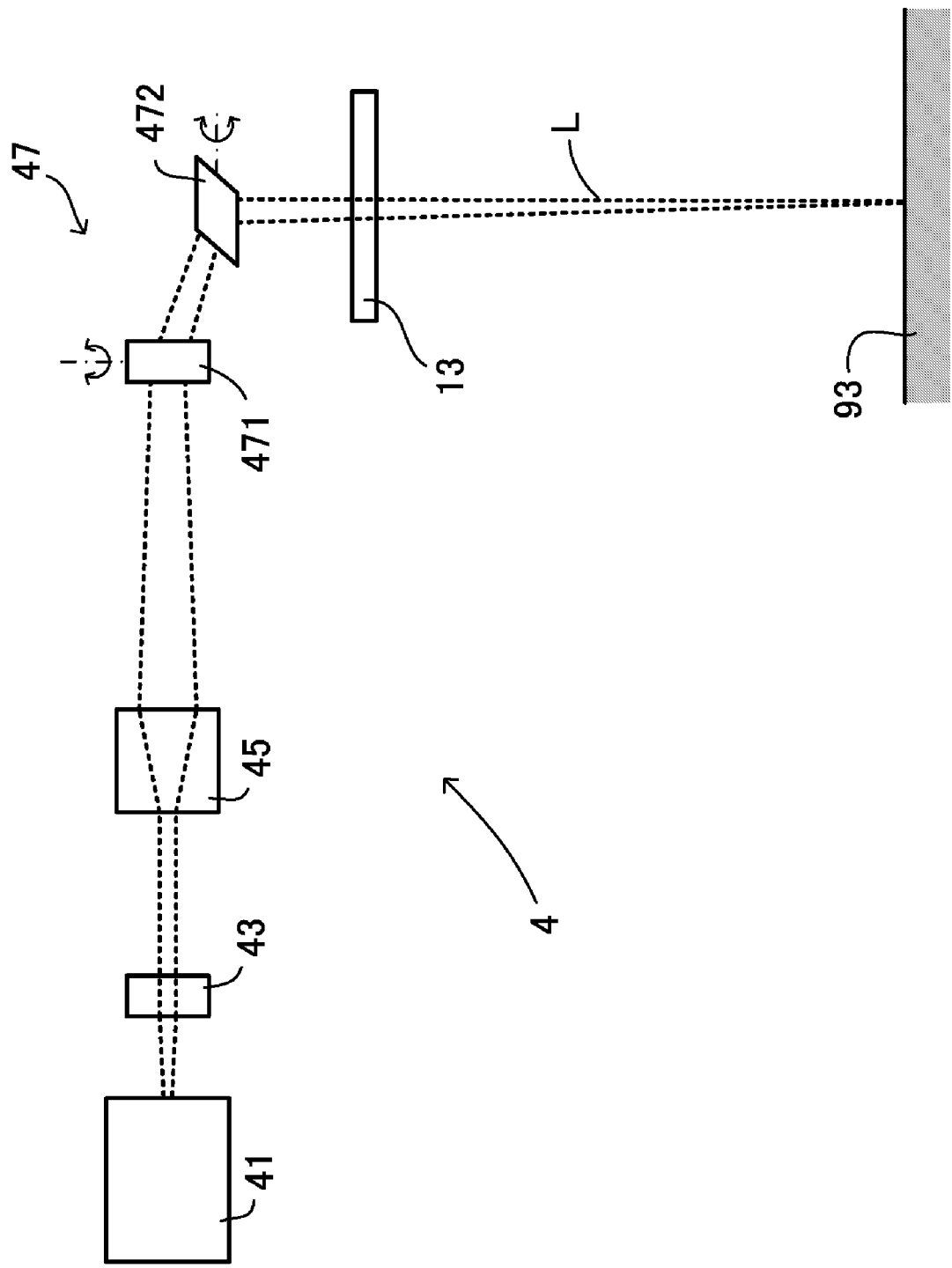
FIG. 5 is a view illustrating a schematic configuration of an irradiation device.

The irradiation device 4 is provided above the chamber 11. The irradiation device 4 irradiates, with a laser beam L, a predetermined irradiation region of the material layer 93 formed on the build region, melts or sinters the material layer 93 of the irradiation location, and forms the solidified layer 95. The irradiation region is present in the build region, and is substantially consistent with a region surrounded by a contour shape of the three-dimensional object in a predetermined divided layer. As shown in FIG. 5, the irradiation device 4 includes a light source 41, a collimator 43, a focus control unit 45, and a scanner 47.

The light source 41 generates the laser beam L. Here, the type of the laser beam L is not particularly limited, as long as the laser beam L can sinter or melt the material layer 93. For example, the laser beam L may be a fiber laser beam, a CO2 laser beam, a YAG laser beam, a green laser beam, or a blue laser beam. The collimator 43 converts the laser beam L output by the light source 41 into parallel light. The focus control unit 45 has a focus adjustment lens and a lens actuator moving the focus adjustment lens forward and backward, and adjusts the laser beam L output by the light source 41 to a desired spot diameter. The scanner 47 is, for example, a galvano scanner. The scanner 47 has an X-axis galvano mirror 471, an X-axis mirror actuator rotating the X-axis galvano mirror 471, a Y-axis galvano mirror 472, and a Y-axis mirror actuator rotating the Y-axis galvano mirror 472. The rotation angles of the X-axis galvano mirror 471 and the Y-axis galvano mirror 472 are controlled, and the X-axis galvano mirror 471 and the Y-axis galvano mirror 472 perform two-dimensional scanning on the laser beam L output by the light source 41.

The laser beam L passing through the X-axis galvano mirror 471 and the Y-axis galvano mirror 472 transmits through a window 13 provided on an upper surface of the chamber 11, and is irradiated to the material layer 93 formed on the build region. The window 13 is formed by a material through which the laser beam L is able to transmit. For example, in the case where the laser beam L is fiber laser or YAG laser, the window 13 may be made of quartz glass.

On the upper surface of the chamber 11, a pollution preventing device 15 is provided to cover the window 13. The pollution preventing device 15 includes a cylindrical housing and a cylindrical diffusing member provided in the housing. An inert gas supply space is formed between the housing and the diffusing member. An opening is formed on a bottom surface of the diffusing member. Multiple pores are formed on the peripheral wall of the diffusing member. A clean inert gas is introduced to the inert gas supply space and supplied into the diffusing member through the pores. The diffusing member is filled with the clean inert gas and the clean inert gas is sprayed downward. Thus, fume is prevented from attaching to the window 13.

Although the irradiation device 4 of the embodiment is configured to irradiate the laser beam L to form the solidified layer 95, the irradiation device 4 may be configured to irradiate an electron beam. For example, the irradiation device 4 may include a cathode electrode emitting electrons, an anode electrode converging and accelerating electrons, a solenoid forming a magnetic field to converge the direction of the electron beam to a direction, and a collector electrode electrically connected with the material layer 93, which is an irradiated body, and applying a voltage between the cathode electrode and the collector electrode.

The cutting device 5 performs cutting with respect to the solidified layer 95. The cutting device 5 includes a processing head 51 which is arranged in the build chamber 11*a* and in which a spindle 53 is built, an X-axis driving device 55 moving the processing head 51 in the X-axis direction, which is a horizontal direction, a Y-axis driving device 57 moving the processing head 51 in the Y-axis direction, which is a horizontal direction orthogonal to the X-axis direction, and a Z-axis driving device 59 moving the processing head 51 in the Z-axis direction, which is a vertical direction. The spindle 53 is configured, so that a cutting tool, such as an endmill, can be mounted and rotated. With such a cutting device 5, during manufacturing of the three-dimensional object, a cutting process with respect to the surface or an undesired portion of the solidified layer 95 may also be performed.

The inert gas supply/discharge mechanism supplies inert gas to the chamber 11, and discharge inert gas containing fume to maintain a clean state inside the chamber 11. The inert gas supply/discharge mechanism includes an inert gas supply device 17, an electrostatic precipitator 6, supply ports 21*a*, 21*b*, 21*c*, 21*d*, and 21*e*, discharge ports 22*a*, 22*b*, and 22*c*, a partition plate 23*a*, an upper guide plate 23*b*, a lower guide plate 23*c*, a fan 23*d*, a straightening vane 23*e*, and pipes for connecting the respective components.

The inert gas supply device 17 supplies inert gas at a predetermined concentration to the chamber 11. The inert gas supply device 17 is, for example, an inert gas generating device extracting inert gas from the air in the surrounding, or a gas cylinder storing inert gas. The inert gas supply device 17 of the embodiment includes a first inert gas supply device 171 and a second inert gas supply device 172. It may be configured that the first inert gas supply device 171 supplies inert gas at a concentration higher than the concentration of the inert gas supplied by the second inert gas supply device 172. In the embodiment, the first inert gas supply device 171 is a PSA-type nitrogen generation device, and the second inert gas supply device 172 is a membrane separation type nitrogen generation device. Nevertheless, the inert gas supply device 17 may also be configured as one inert gas supply device. The inert gas may be any gas substantially non-reactive to the material layer 93 or the solidified layer 95, and may be suitably selected from nitrogen gas, argon gas, helium gas, etc., in accordance with the type of the material powder.

The electrostatic precipitator 6 removes a majority of the fume from the inert gas discharged from the chamber 11 and returns the inert gas to the chamber 11. The detailed configuration of the electrostatic precipitator 6 will be described in the following.

The supply port 21*a* is provided on a side surface of the recoater head 33. The supply port 21*b* is provided at a pipe laid on an end surface of the base stage 31 on a side opposite to the side where the support port 21*a* is provided. The supply port 21*a* and the supply port 21*b* are respectively connected to the first inert gas supply device 171. The inert gas is supplied to the chamber 11 selectively through the supply port 21*a* or the supply port 21*b* in accordance with the movement position of the recoater head 33. That is, when the supply port 21*a* is at a location facing the build region, the inert gas is supplied through the supply port 21*a*, and when the supply port 21*a* is at a location not facing the build region, the inert gas is supplied through the supply port 21*b*. The supply port 21*c* is provided on a sidewall of the chamber 11 on the side where the supply port 21*b* is provided. The supply port 21*c* is connected to the electrostatic precipitator 6, and the inert gas in which the majority of the fume is removed by the electrostatic precipitator 6 is returned to the chamber 11 via the supply port 21*c*. The supply port 21*d* is provided on the upper surface of the chamber 11, and is connected to the first inert gas supply device 171. The inert gas is supplied to the inert gas supply space of the pollution preventing device 15 via the supply port 21*d*. The supply port 21*e* is provided at an upper part of the driving chamber 11*b* and connected to the second inert gas supply device 172. The inert gas supplied from the second inert gas supply device 172 to the driving chamber 11*b* is supplied into the build chamber 11*a* through the communication part between the build chamber 11*a* and the driving chamber 11*b*.

The partition plate 23*a* is provided to cover a sidewall of the chamber 11 opposite to the side on which the supply port 21*b* and the supply port 21*c* are provided. The discharge port 22*a* is provided in a space defined by the partition plate 23*a* and the sidewall and on the upper surface of the chamber 11, and the discharge port 22*b* is provided on the upper surface of the chamber 11 on the build region side in the vicinity of the partition plate 23*a*. Below the discharge port 22*b*, the upper guide plate 23*b* extending in an L-shaped cross-section on the side of the partition plate 23*a* to surround the discharge port 22*b*. On the lower end of the partition plate 23a, the lower guide plate 23c whose lower part extends to the build region side is provided, and a predetermined gap is formed between the partition plate 23a and the lower guide plate 23c. The gap is located at a height lower than the center of the build room 11a. Multiple fans 23d attracting the inert gas to a space partitioned by the partition plate 23a and the sidewall are provided in the vicinity of the gap, and the straightening vane 23e extending upward is provided on two ends of each of the fans 23d. The inert gas 23a transmitted to the vicinity of the partition plate 23a is transmitted to the discharge port 22a through the space defined by the partition plate 23a and the sidewall from the gap or the below of the lower guide plate 23c. The inert gas not collected from the gap rises along the partition plate 23a, and is guided by the upper guide plate 23b to the discharge port 22b. The discharge port 22c is provided on the side surface of the recoater head 33 on which the supply port 21a is not provided. The inert gas is discharged from the chamber 11 to the electrostatic precipitator 6 through the discharge port 22a, the discharge port 22b, and the discharge port 22c.

The configuration of the inert gas supply/discharge mechanism shown above is merely an example. The locations, shapes, and number of the supply ports supplying the inert gas to the chamber 11 and the discharge ports discharging the inert gas from the chamber 11 can be set arbitrarily as long as the setting is suitable for the supply and discharge of the inert gas.

Figure 6:
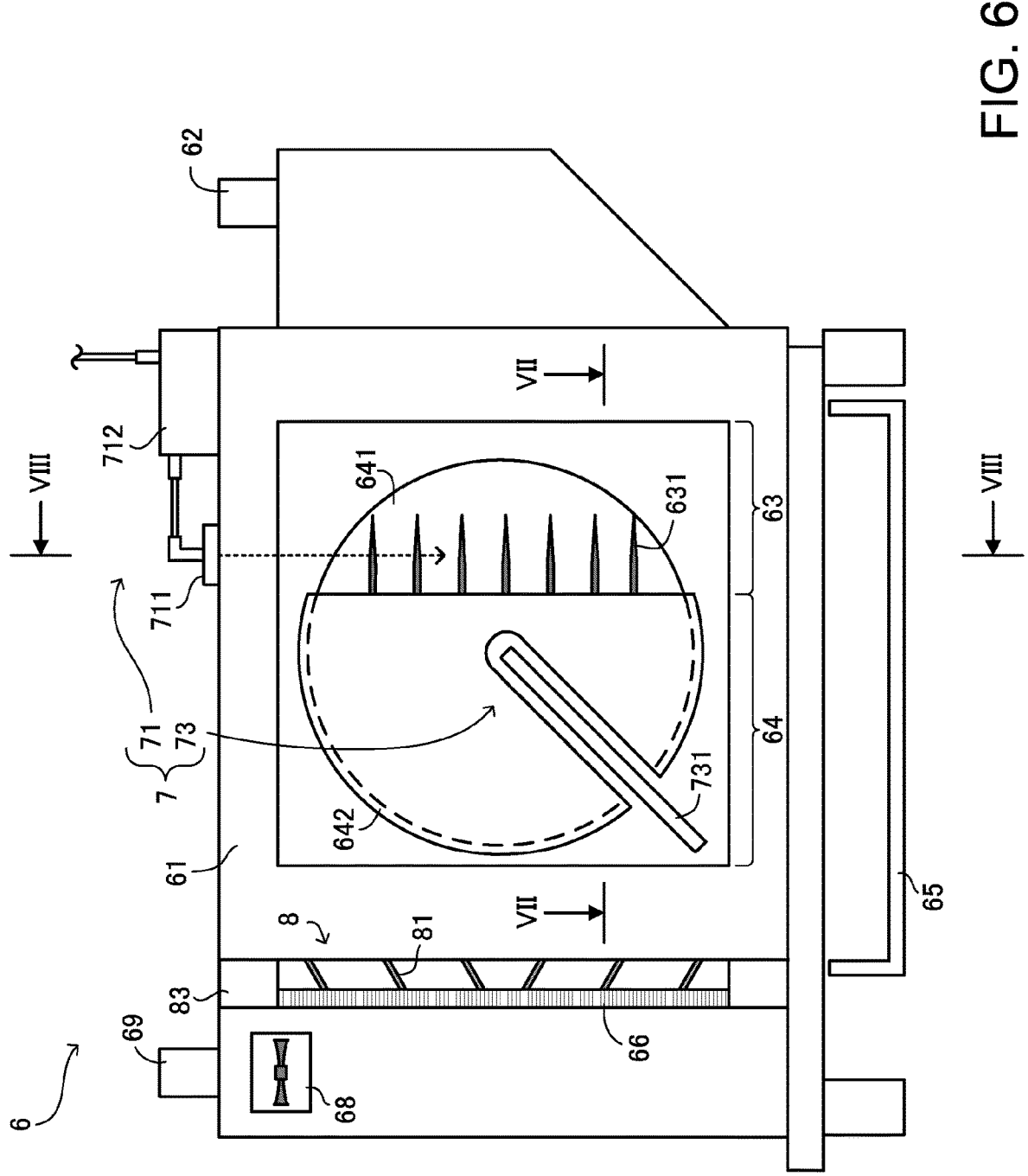
FIG. 6 is a view illustrating a schematic configuration of an electrostatic precipitator according to the embodiment.

Here, the configuration of the electrostatic precipitator 6 according to the embodiment will be described. As shown in FIG. 6, the electrostatic precipitator 6 includes a housing 61, a gas inlet 62, a charging part 63, a collecting part 64, a cleaning device 7, a bucket 65, a magnet filter 8, an ozone removing filter 66, a fan 68, and a gas outlet 69. In the electrostatic precipitator 6 of the embodiment, the charging part 63 and the collecting part 64 are formed integrally. In other words, the electrostatic precipitator 6 of the embodiment is a so-called one-stage (Cottrell-type) dry-type electrostatic precipitator. In the following, "upstream" and "downstream" are defined along the flowing direction of the gas (inert gas). In other words, in the electrostatic precipitator 6, a place relatively near the gas inlet 62 is defined as an upstream side, and a place relatively near the gas outlet 69 is defined as a downstream side.

The gas inlet 62 is provided on the housing 61, and is connected to the discharge ports 22a, 22b, and 22c. The gas containing fume and discharged from the chamber 11, that is, the inert gas containing fume, is supplied to the gas inlet 62 and transmitted into the housing 61.

Figure 7:
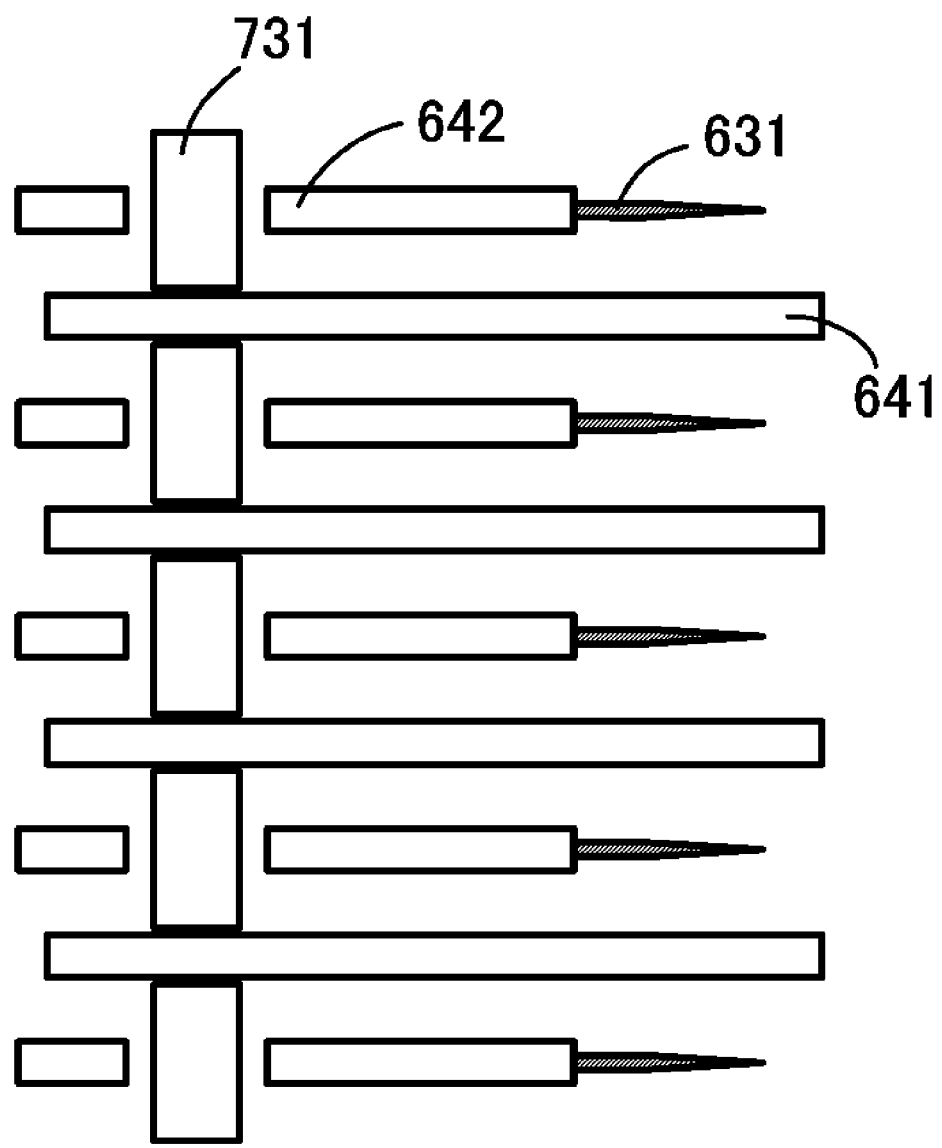
FIG. 7 is a view taken along an arrow VII-VII of FIG. 6.

The discharging part 63 and the collecting part 64 are formed integrally and provided inside the housing 61. As shown in FIGS. 6 and 7, multiple positive electrode plates 642 are provided at predetermined intervals, and respective multiple needle-shaped load electrodes 631 are attached to the positive electrode plate 642. The positive electrode plates 642 and the load electrodes 631 can be positively charged by a voltage supply means not shown herein. In each of the intervals of the positive electrode plates 642, a collecting plate 641 is provided. The collecting plate 641 is earth-connected, and is configured to be rotatable.

The inert gas containing fume, which is supplied from the gas inlet 62, is transmitted to the charging part 63. The load electrodes 631 in the charging part 63 positively charge the fume in the inert gas by corona discharge. The positively charged fume, in the collecting part 64, repels the positive electrode plates 642 due to a Coulomb force and is attracted to the collecting plates 641 to be captured.

The inert gas in which the fume is removed by the collecting part 64 passes through the magnet filter 8 and the ozone removing filter 66 and is transmitted to the gas outlet 69. The gas outlet 69 is provided on the housing 61, and is connected to the supply port 21c. Accordingly, the inert gas in which the fume is removed is discharged from the electrostatic precipitator 6 and is returned to the chamber 11.

In the embodiment, the charging part 63 is configured to positively charge the fume that is dust. However, the charging part 63 may also negatively charge the fume. In place of the needle-shaped load electrodes 631, electrodes in a shape of metal thin wires or in a brush shape may also be used.

The cleaning device 7 removes the fume, which is dust, from at least one of the charging part 63 and the collecting part 64, restores the capturing ability, and allows the electrostatic precipitator 6 to be used continuously for a long time. The cleaning device 7 of the embodiment includes a charging part cleaning device 71 removing the fume attached to the charging part 63 and a collecting part cleaning device 73 removing the fume attached to the collecting part 64.

Figure 8:
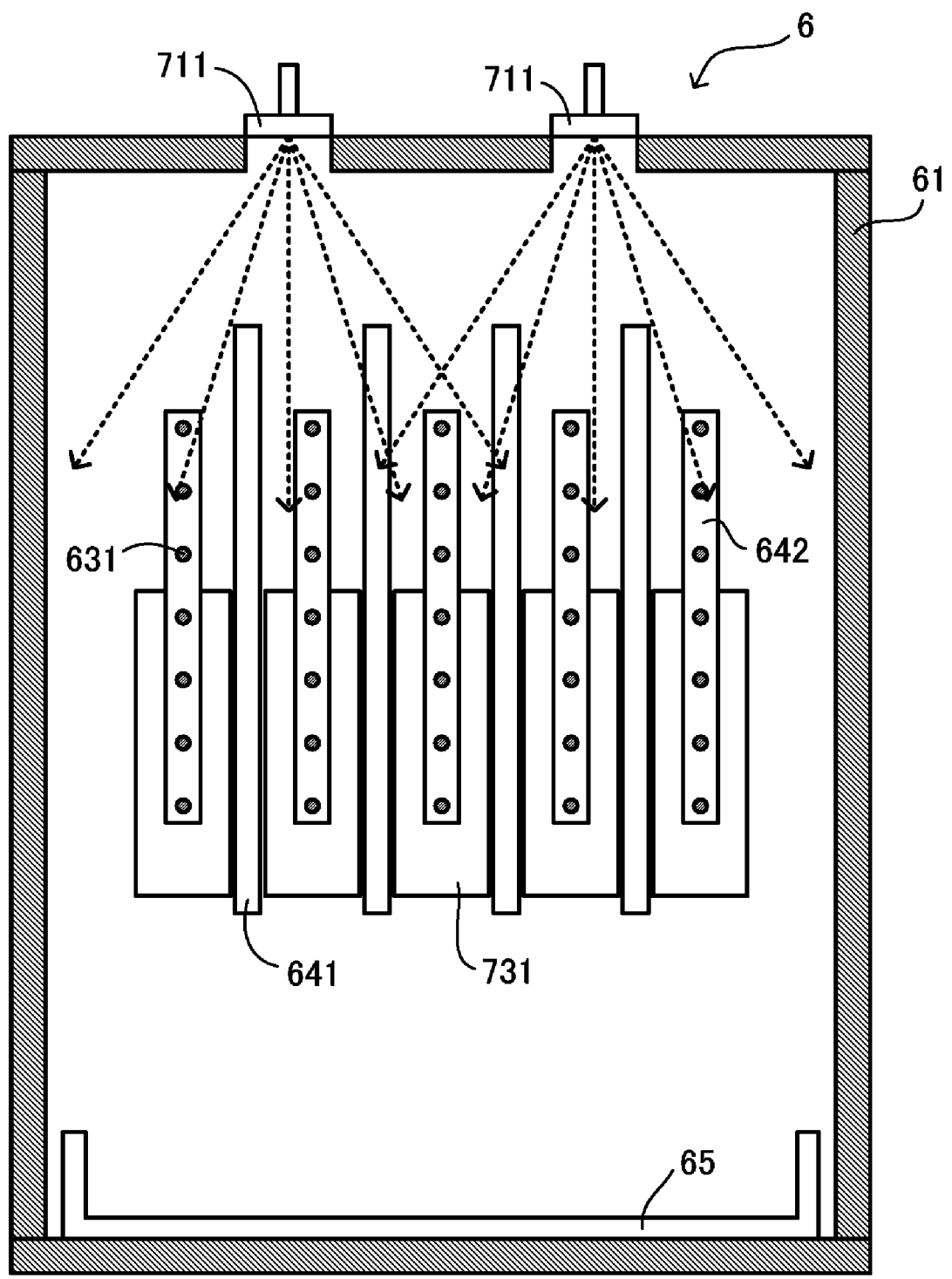
FIG. 8 is a view taken along an arrow VIII-VIII of FIG. 6.

The charging part cleaning device 71 includes, for example, nozzles 711 and an intermittent ejection control part 712. The nozzles 711 are provided above the load electrodes 631. By ejecting gas from the nozzles 711 to the load electrodes 631, the fume attached to the load electrodes 631 of the charging part 63 can be removed. To ensure the predetermined inert gas atmosphere inside the chamber 11, the gas ejected from the nozzles 711 may be the same gas as the inert gas supplied to the chamber 11. In the embodiment, a branch pipe 19 is provided between the supply ports 21a, 21b, and 21d and the first inert gas supply device 171, and the inert gas is supplied from the first inert gas supply device 171 to the nozzles 711 via the branch pipe 19. In order to not cause a short circuit between the nozzles 711 and the load electrodes 631 as well as the positive electrode plates 642, the nozzles 711 may be manufactured by using a non-conductive material, such as resin. Also, it may be configured so that the load electrodes 631 of a wide range can be cleaned by using a small number of nozzles 711. For example, as shown in arrows in broken lines in FIGS. 6 and 8, fan-shaped nozzles which eject the inert gas in fan shapes to cover all the load electrodes 631 are used as the nozzles 711. The intermittent ejection control part 712 performs control so that the inert gas is ejected intermittently from the nozzles 711. By intermittently ejecting the inert gas, compared with the case of continuous ejection, the inert gas of a higher flow rate can be intermittently ejected to the load electrodes 631, and the cleaning efficiency can be facilitated. In addition, the inert gas for cleaning can be saved.

The collecting part cleaning device 73 has, for example, a plate-shaped scraper 731 provided to be close or adjacent to side surfaces of the collecting plates 641 and a motor (not shown) rotating the collecting plates 641. During cleaning of the collecting plates 641 of the collecting part 64, the collecting plates 641 are rotated by the motor (not shown) to scarp off the attached fume by using the scraper 731.

The fume removed by the charging part cleaning device 71 and the collecting part cleaning device 73 drops to the bucket 65 provided below the charging part 63 and the collecting part 64.

The charging part cleaning device 71 and the collecting part cleaning device 73 are not limited to the above configuration. For example, the charging part cleaning device 71 of the embodiment has the nozzles 711 that are fan-shaped nozzles ejecting the inert gas in fan shapes. However, in place of such nozzles 711, the charging part cleaning device 71 may also be configured as having nozzles respectively provided above each row of the load electrodes 631 and ejecting the inert gas linearly toward the load electrodes 631. The collecting part cleaning device 73 may also have a nozzle ejecting the inert gas to the collecting plates 641, and may also have a hammering device vibrating the collecting plates 641. The cleaning device 7 may also include only one of the charging part cleaning device 71 and the collecting part cleaning device 73.

At the time of cleaning by using the cleaning device 7, the charging to the positive electrode plates 642 and the load electrodes 631 may be stopped temporarily. At this time, since the collecting ability is lowered temporarily, it may be configured that the additive manufacturing apparatus 1 does not perform the formation of the solidified layer 95 at the time of cleaning. In other words, it may be configured that the cleaning device 7 cleans the charging part 63 or the collecting part 64 at the time when the formation of the solidified layer 95 is not performed. For example, the cleaning device 7 may perform cleaning at the time of forming the material layer 93 or at the time of performing the cutting process on the solidified layer 95.

Here, the configurations of the magnet filter 8 and the ozone removing filter 66 are described in detail. The magnet filter 8 is provided downstream of the collecting part 64 in the housing 61. The ozone removing filter 66 is provided even downstream of the magnet filter 8 in the housing 61.

The magnet filter 8 has multiple magnet plates 81, and the magnet plates 81 are arranged at a predetermined interval. In the case where the dust is a magnetic substance, when passing through the magnet plates 81, the dust not captured by the collecting part 64 or the dust scattered for another time when the cleaning device 7 performs cleaning are captured by the magnet plates 81 due to the magnetic force. The dust scattered for another time is thus prevented from attaching to and clogging the ozone removing filter 66 located downstream of the magnet filter 8. Among the magnet plates 81, magnet plates 81 adjacent to each other may be arranged to face each other with different polarities. In other words, in each magnet plate 81, the orientations of N-polarity and S-polarity are unified in a direction. By doing so, the magnetic flux density among the respective magnet plates 81 can be increased, and dust capturing can be performed more favorably.

The magnet plates 81 are arranged, so that downstream sides are inclined downward on an upper side with respect to the center, and downstream sides are inclined upward on a lower side with respect to the center. Specifically, the magnet filter 8 has six magnet plates 81. In three of the magnet plates 81 located on the upper side with respect to the center, the downstream sides are arranged to be inclined downward. In three of the magnet plates 81 located on the lower side with respect to the center, the downstream sides are arranged to be inclined upward. By so arranging the magnet plates 81, the magnet filter 8 operates as a straightening vane with respect to the ozone removing filter 66. That is, the gas passing through the magnet plates 81 is diffused and supplied substantially uniformly over a wider area in a filtering area of the ozone removing filter 66. Accordingly, the ozone removing filter 66 can be prevented from deteriorating locally, and the service time of the ozone removing filter 66 can be increased.

Figure 9:
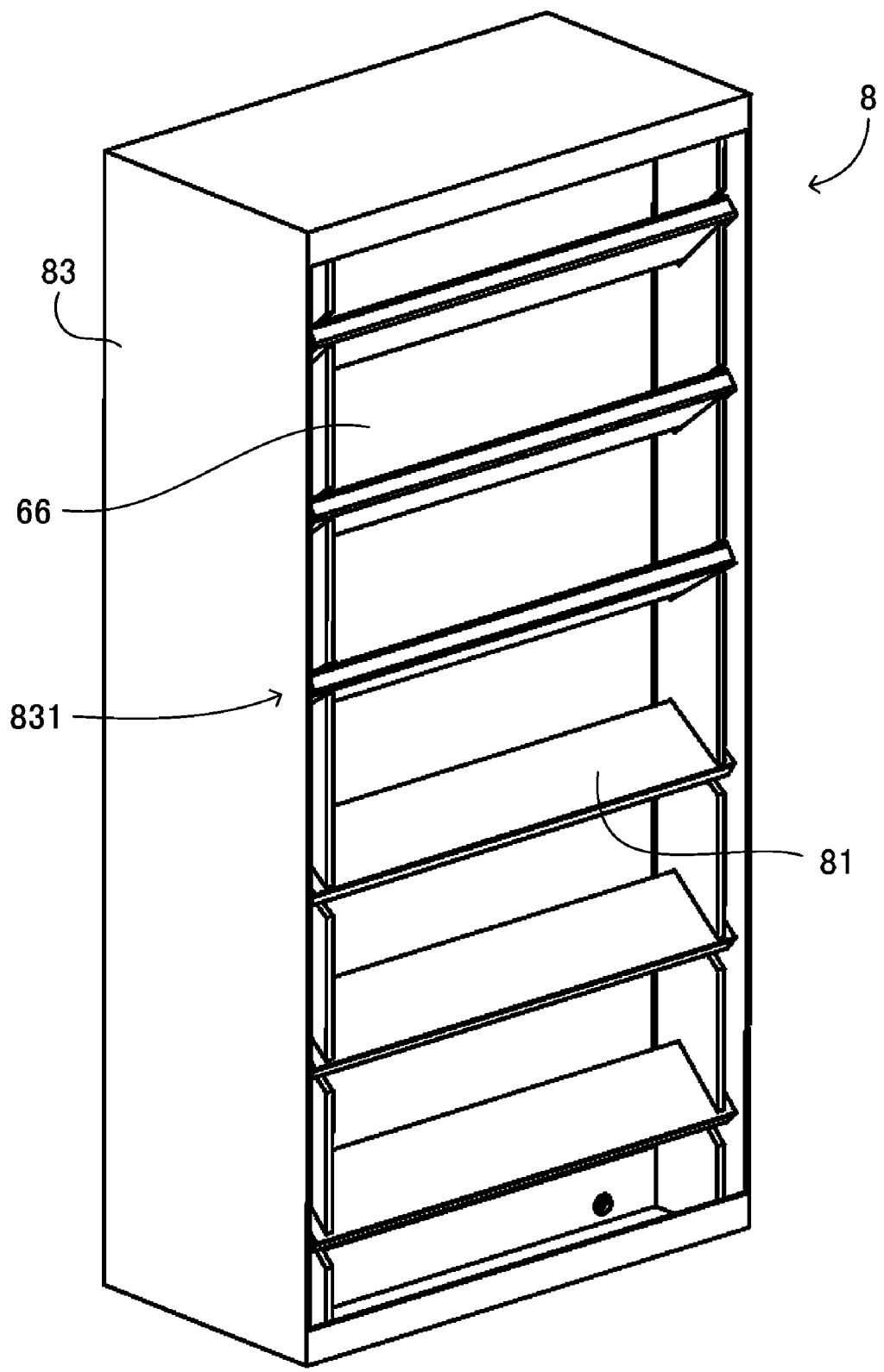
FIG. 9 is a perspective view of a magnet filter.

For the ease of maintenance, as shown in FIG. 9, the magnet filter 8 and the ozone removing filter 66 may also be attached to a frame 83 configured to be detachable from the housing 61. Notches 831 into which the magnet plates 81 are able to be inserted are formed in the frame 83, and the magnet plates 81 are inserted into the notches 831 to be attached to the frame 83. For example, by forming the frame 83 by using a magnetic substance, the magnet plates 81 can be fixed to the frame 83 by a magnetic force, and the attachment and removal of the magnet plates 81 are easy.

Figure 10:
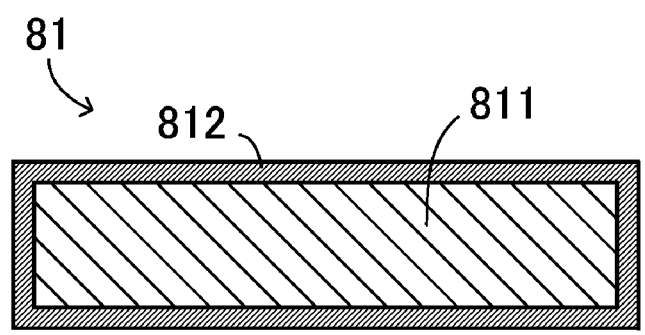
FIG. 10 is a cross-sectional view of a magnet plate according to the embodiment.

The magnet plate 81 of the embodiment is formed to have a permanent magnet 811. More specifically, as shown in FIG. 10, each magnet plate 81 has the permanent magnet 811 and a case 812 holding the permanent magnet 811 and formed of a magnetic substance. According to such configuration, dust can be prevented from directly attaching to the permanent magnet 811, and by removing the permanent magnet 811 from the case 812, the dust attached to the case 812 can be easily removed.

The ozone removing filter 66 removes the ozone generated at the time of corona discharge from the gas. The ozone removing filter 66 is formed by filling a carrier having a honeycomb structure, for example, with activated carbon or an ozone decomposition catalyst, such as manganese dioxide or nickel oxide. The ozone passing through the ozone removing filter 66 is decomposed by the activated carbon or the ozone decomposition catalyst.

The fan 68 sends out the gas inside the electrostatic precipitator 6 and generates an air flow, and efficiently circulate the gas. The fan 68 may be arranged at any position in the housing 61. However, in order to avoid contamination due to dust or deterioration due to ozone, the fan 68 may be provided downstream of the ozone removing filter 66. When the cleaning device 7 performs cleaning, the fan 68 is stopped.

According to the above, dust and ozone are removed from the gas supplied from the gas inlet 62, and the gas is discharged from the gas outlet 69.

Figure 11:
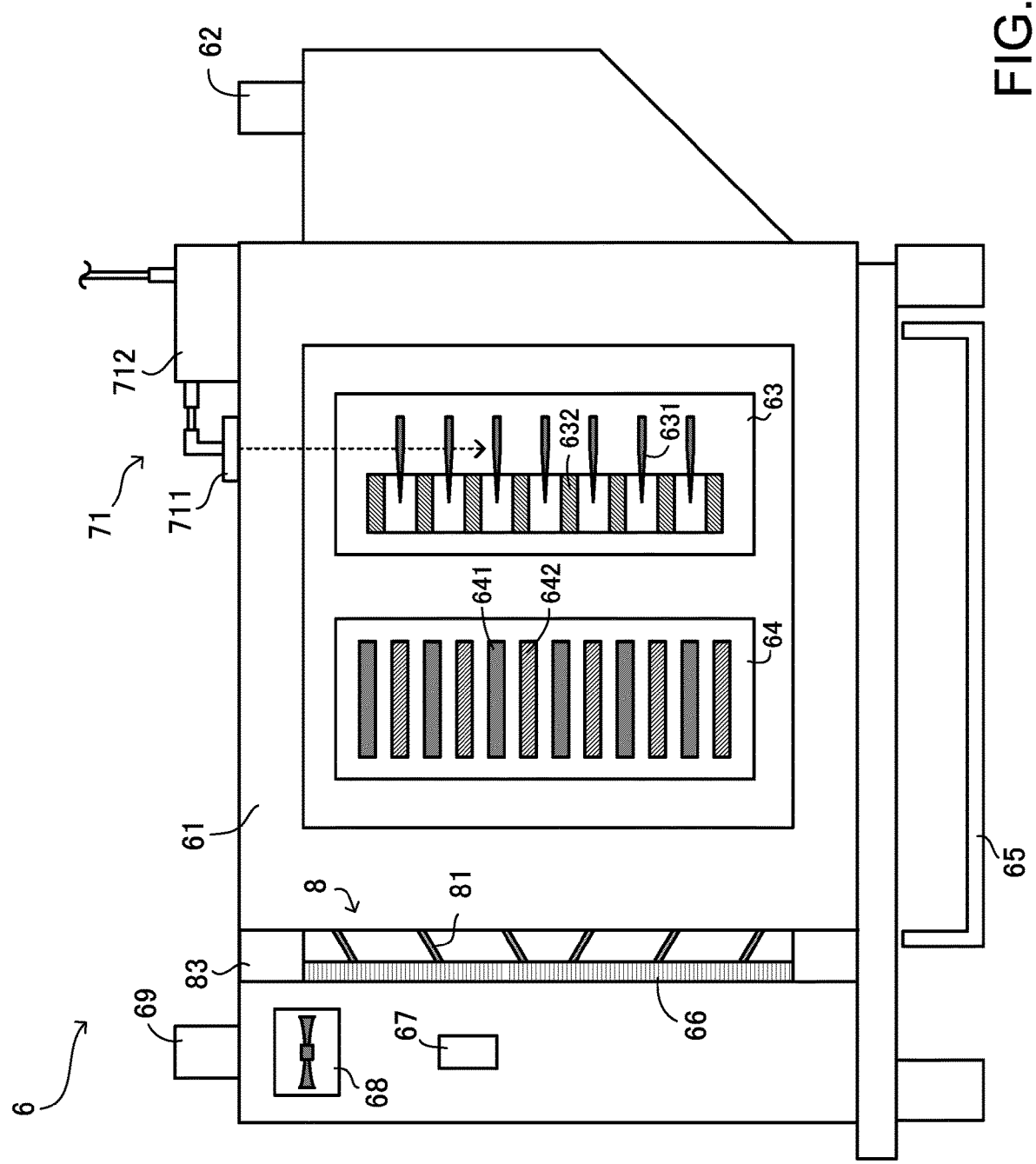
FIG. 11 is a view illustrating a schematic configuration of an electrostatic precipitator according to a modified example.

Here, a modified example relating to the electrostatic precipitator 6 as shown in FIG. 11 is described. In FIG. 11, the components same as or equivalent to those in the configuration of the above embodiment are labeled with the same reference symbols, and the detailed descriptions are omitted.

The electrostatic precipitator 6 according to the modified example is a so-called two-stage (Penny-type) dry-type electrostatic precipitator, in which the charging part 63 and the collecting part 64 are formed separately. That is, the electrostatic precipitator 6 may also include the charging part 63 in which the positively charged, needle-shaped load electrodes 631 and counter electrodes 632 which are earth-connected are arranged to face each other, and the collecting part 64 in which the positively charged positive electrode plates 642 and the collecting plates 641 which are earth-connected are alternately provided. Also, the charging part 63 may also be configured to negatively charge the fume that is dust.

The multiple magnet plates 81 of the modified example are respectively provided with electromagnets. By energizing the electromagnets, a magnetic field is generated, and dust that is a magnetic substance can be removed. When the magnet plate 81 is formed by an electromagnet, it may be configured that an oxygen concentration meter 67 which measures an oxygen concentration of the gas is provided downstream of the collecting part 64 in the housing 61, and when the oxygen concentration of the gas is higher than an oxygen concentration threshold at which dust ignites, the electromagnet is not energized.

The invention is not limited to the configurations of the embodiments shown in the drawings, as some examples have already been specifically shown. Various modifications or applications are possible without departing from the technical idea of the present invention.

What is claimed is:

1. An electrostatic precipitator, comprising:
    a housing;
    a gas inlet, provided on the housing, and supplied with gas containing dust that is a magnetic substance;
    a charging part, provided inside the housing and positively or negatively charging the dust;
    a collecting part, provided inside the housing and capturing the charged dust;
    a cleaning device, provided in the housing, and comprising at least one of a charging part cleaning device that removes the dust attached to the charging part and a collecting part cleaning device that removes the dust attached to the collecting part;
    a magnet filter, provided downstream of the collecting part and inside the housing;
    an ozone removing filter, provided downstream of the magnet filter and inside the housing and removing ozone from the gas; and
    a gas outlet, provided on the housing and discharging the gas in which the dust and the ozone are removed,
    wherein in the magnet filter, a plurality of magnet plates are arranged at a predetermined interval, a downstream side of each magnet plate provided on an upper side with respect to a center is inclined downward, and a downstream side of each magnet plate provided on a lower side with respect to the center is inclined upward.

2. The electrostatic precipitator as claimed in claim 1, wherein each of the magnet plates comprises a permanent magnet and a case holding the permanent magnet and formed of a magnetic substance.

3. The electrostatic precipitator as claimed in claim 1, wherein each of the magnet plates comprises an electromagnet.

4. The electrostatic precipitator as claimed in claim 3, further comprising an oxygen concentration meter, provided downstream of the collecting part and inside the housing and measuring an oxygen concentration of the gas,
    wherein in the electrostatic precipitator, when an oxygen concentration of the gas is higher than an oxygen concentration threshold at which the dust ignites, the electromagnet is not energized.

5. The electrostatic precipitator as claimed in claim 1, wherein among the magnet plates, magnet plates adjacent to each other are arranged to face each other with different polarities.

6. The electrostatic precipitator as claimed in claim 1, further comprising a frame which holds the magnet filter and the ozone removing filter and is detachable from the housing.

7. The electrostatic precipitator as claimed in claim 6, wherein notches into which the magnet plates are insertable are formed in the frame, and the magnet plates are inserted into the notches to be fixed to the frame by a magnetic force.

8. The electrostatic precipitator as claimed in claim 1, wherein the ozone removing filter comprises activated carbon or an ozone decomposition catalyst.

9. The electrostatic precipitator as claimed in claim 1, further comprising a fan, provided downstream of the ozone removing filter inside the housing and sending out the gas.

10. An additive manufacturing apparatus, comprising the electrostatic precipitator as claimed in claim 1, wherein:
    the additive manufacturing apparatus comprises:
        a chamber, covering a predetermined build region, and filled with inert gas at a predetermined concentration;
        an irradiation device, irradiating a material layer formed in the build region with a laser beam or an electron beam and forming a solidified layer;
        a supply port, supplying the inert gas to the chamber;
        a discharge port, discharging the inert gas from the chamber; and
        an inert gas supply device, supplying the inert gas to the supply port,
    the gas is the inert gas,
    the dust is fume generated when the solidified layer is formed, and
    the inert gas discharged from the discharge port is transmitted to the electrostatic precipitator, and is returned to the supply port after the fume is removed.

11. The additive manufacturing apparatus as claimed in claim 10, further comprising a cutting device performing a cutting process on the solidified layer.

12. The additive manufacturing apparatus as claimed in claim 10, wherein the cleaning device cleans the charging part or the collecting part when formation of the solidified layer is not performed.

* * * * *